Inventors
James H. Wernig &
Gustave Chutorash
By Blackmore, Spencer & Flint
Attorneys Patented May 21, 1940

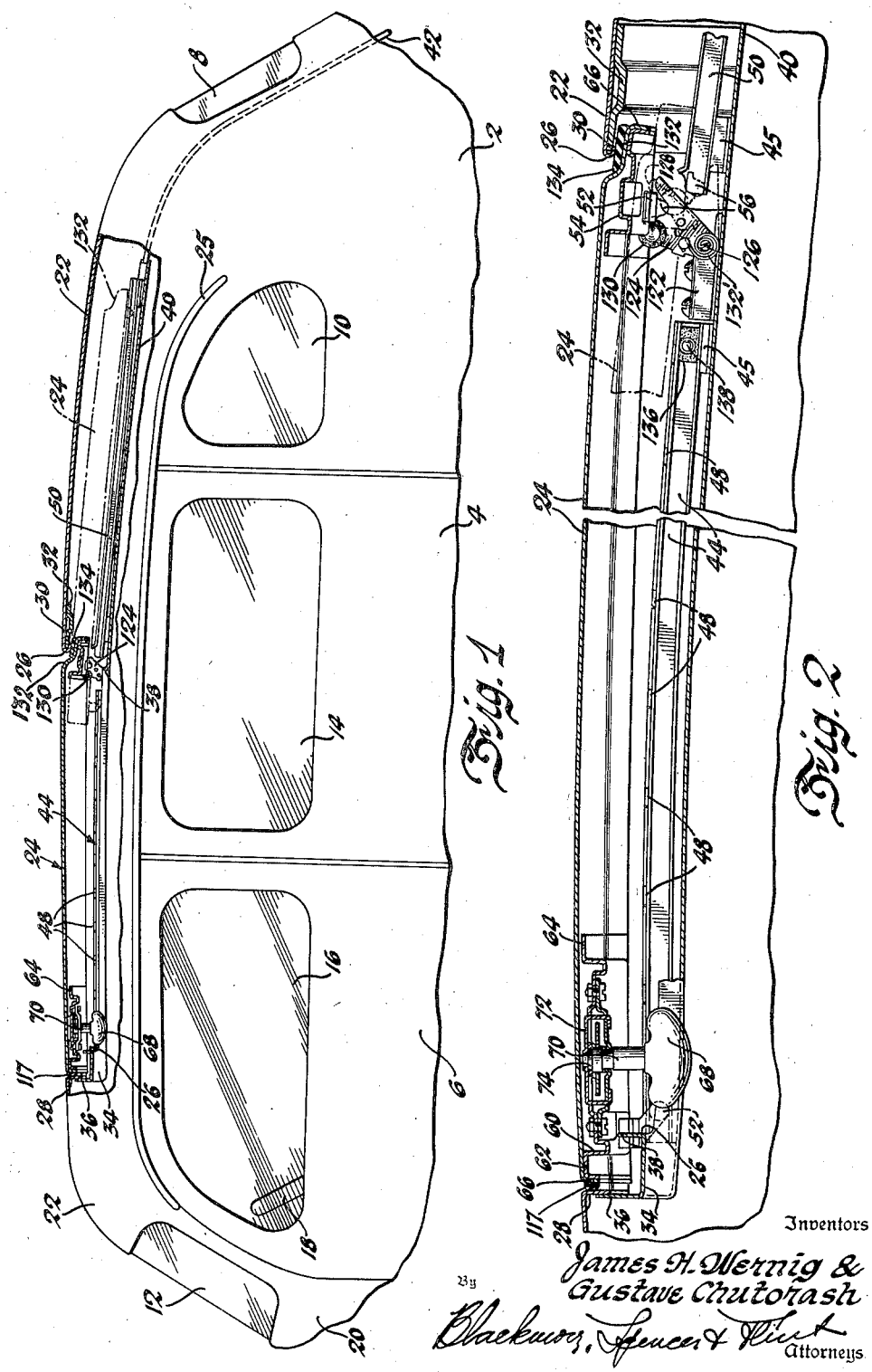

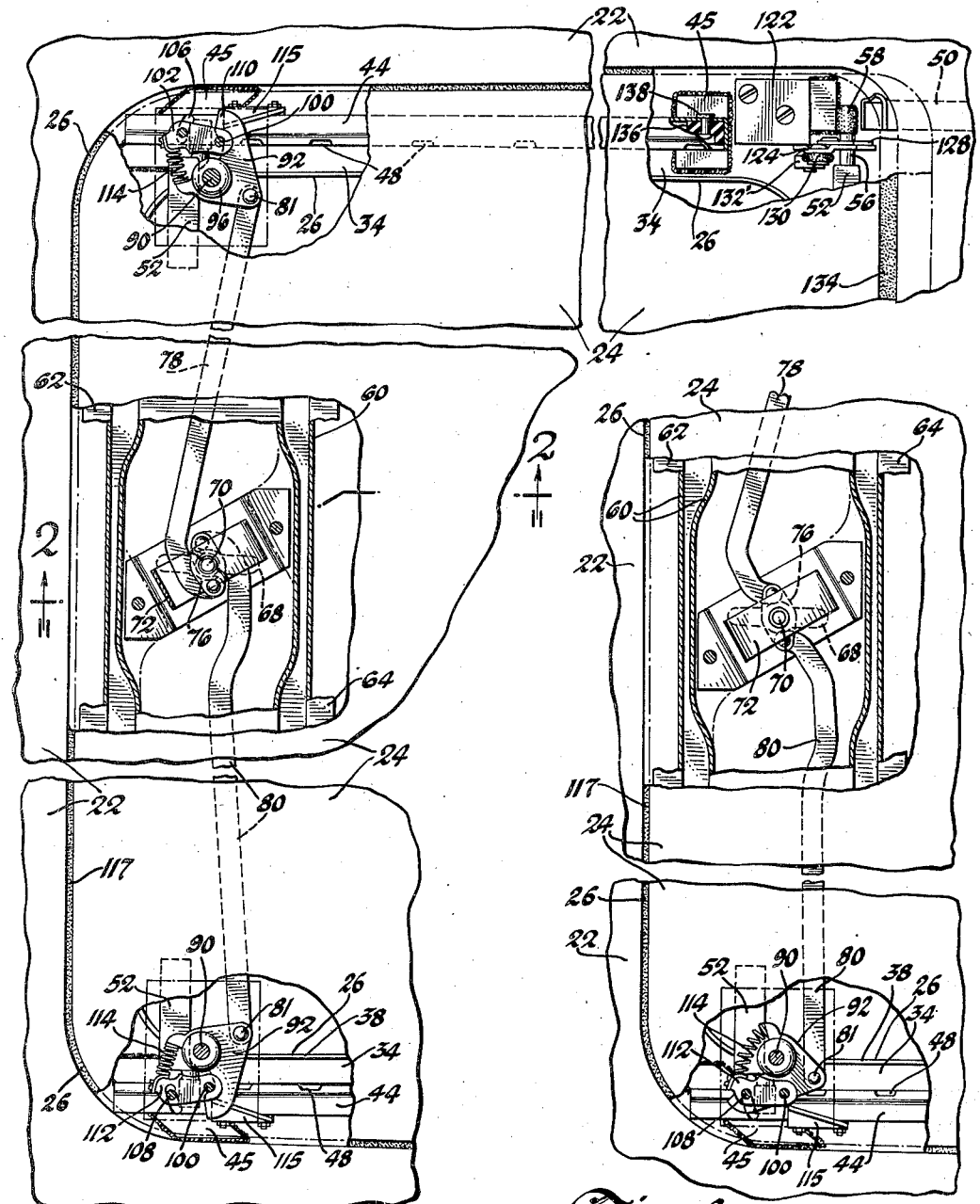

2,201,330

UNITED STATES PATENT OFFICE 2,201,330

SLIDING TOP LATCHING MECHANISM

James H. Wernig and Gustave Chutorash, Detroit, Mich., assignors to Ternstedt Manufacturing Company, Detroit, Mich., a corporation of Michigan Application November 18, 1938, Serial No. 241,120

7 Claims. (Cl. 292—48)

This invention relates to sliding tops as applied to closed automotive vehicles.

Sliding tops are in general old and the present invention relates to improvements in the mechanism for locking the sliding top in any one of a plurality of positions so that the opening closed by the sliding top may be more or less exposed by the occupants of the vehicle.

The sliding top or panel is of the type which, when it is moved from closed to open position, passes underneath a stationary part of the roof or top at the rear of the vehicle. Further details of the sliding top and the manner in which it is moved from open to closed position and vice versa are disclosed and claimed in the copending application of Emory Glenn Simpson, Serial No. 238,236, filed November 1, 1938.

The essential novelty to the present locking mechanism resides in the provision at the extreme front corners of the sliding top of latching mechanism comprising two levers one of which is operated by a linkage operated from the middle of the vehicle and the other of which is moved in one direction by the first lever and in the reverse direction by a spring positioned between the two levers. The second lever is pivoted to a plate secured to the underside of the sliding top and has a projection or finger which is adapted to engage in any one of a plurality of spaced notches in the guides, tracks or runways in which the trunnions of the sliding top run to direct the top from the front to the rear of the vehicle. At the forwardmost end of the track a bracket is secured thereto and when the top is moved forward as far as it will ordinarily go by manual movement the operation of the linkage mechanism at the center of the top will cause the first lever to engage the bracket and force the sliding top as a whole forward a slight distance to insure a tight fit of the sliding top inside the enclosure or opening in the roof. The edges of the opening are preferably provided with a suitable soft packing such as felt, rubber, or the like, so that when the top is urged forwardly by the locking mechanism to its extreme closed position there will be a tight joint around the entire sliding top caused by a compression of the packing and thus prevent the entrance of rain or dust.

The opening in the roof to receive the sliding top as well as the sliding top itself have slightly diverging sides, that is, the front of the sliding top and the front of the opening are slightly narrower than the rear so that when the top is urged forward to its final latching position there will be a binding effect at the front and the sides to give a very tight seal.

The rear of the sliding top in its final closing movement is urged upwardly by suitable lever mechanism described and claimed in the copending application of Simpson, Serial No. 238,-236, mentioned in the foregoing.

On the drawings

Figure 1 is a side view of a closed automobile body with parts broken away and shown in section to illustrate the sliding top, the sliding top being shown in its open position in dotted outline.

Figure 2 is an enlarged sectional detailed view of the structure of Figure 1 and taken on the line 2—2 of Figure 3 showing the parts on a larger scale and in greater detail and also showing in dotted outline at the right the position of the sliding top as its movement underneath the stationary part of the top is commenced.

Figure 3 is a plan view of the latching mechanism with parts broken away and shown in section and showing the position of the parts when the sliding top is latched in its extreme forward position.

Figure 4 is a view similar to Figure 3 of the latching mechanism when the parts are moved to unlatched position.

Figure 5:
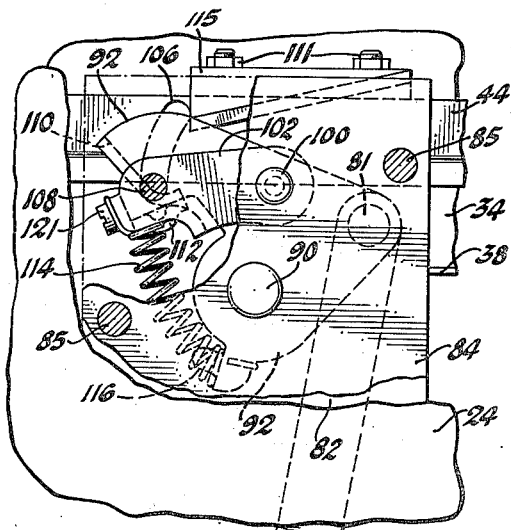
Figure 5 is an enlarged view of the latching mechanism at one side of the vehicle with the parts in unlatched position and the sliding top at its forward position, parts being broken away for clearer illustration.

Referring to the drawings, the numeral 2 indicates a closed vehicle as a whole. The vehicle has the rear door 4, front door 6, the back window 8, the rear side window 10 and the windshield 12. The doors 4 and 6 have the usual windows 14 and 16 and the steering wheel is shown at 18. 20 indicates the usual cowl and 22 the stationary part of the roof. The sliding part of the roof is indicated as a whole at 24. The usual rain channel or trough at the side of the vehicle is indicated at 25. The parts so far described are in general conventional, and per se form no part of the invention.

The automobile body 2 to which the invention is applied is preferably of the all metal type and except as otherwise indicated, the parts are of metal.

As will be seen from Figure 1, the sliding roof 24 is at the front of the vehicle and is adapted to fit in and close an opening indicated by the numeral 26. When in closed position the movement of the top or roof 24 is flush with the stationary top or roof 22. The opening 26 has a downturned flange 28 therearound except at the rear part where the flange is return bent as shown at 30 and has the reinforcing member 32 positioned therein, the reinforcing member 32 being secured to the roof 22 in any suitable way such as by welding.

A trough 34, channel shaped in cross section, has the longer leg 36 of the channel secured as by welding to the flange 28, while the shorter leg 38 extends inwardly of the opening 26, and at the front edge and at the two sides it forms a trough in which any rain which may pass through the edges of the opening may collect and this rain will be directed to the rear through the trough 40 and passed out underneath the rear of the vehicle through the drain pipes 42. One drain pipe 42 is positioned at each side of the vehicle.

Figure 11:
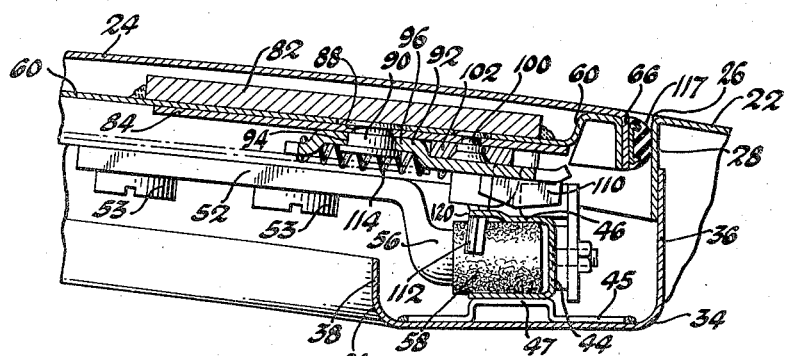
Figure 11 is an enlarged sectional detailed view, taken transversely of the vehicle, of one of the latching mechanisms.
Figure 12:
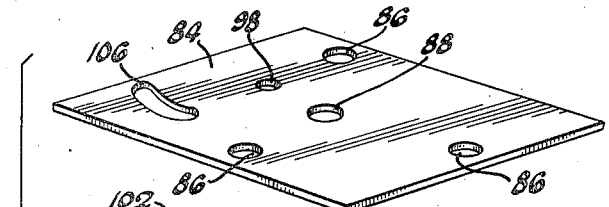
Figure 12 is an expanded perspective view of one of the latching mechanisms.

In the U-shaped troughs 34 at the sides of the vehicle the forward tracks or runners 44 are secured. There is one runner at each side of the vehicle and the runners comprise a channel or U-shaped element placed on its side as is best indicated in Figure 11. The tracks 44 are secured in place by the brackets 45, secured at their edges to the bottom of the channels 34 as by welding. Each bracket 45 has an upwardly pressed part 47 to which the tracks 44 are welded. The upper arm 46 of the U-shaped track 44 has its edge bent slightly upwardly away from the main part of the arm 46 and the edge of this arm 46 is provided with a plurality of notches 48 for the reception of the lug or the latching element of the latching mechanism. As many of these notches 48 as desired may be provided.

The runners or tracks 44 extend from the front of the opening 26 to substantially the rear thereof where they terminate, and underneath the rear stationary part 22 of the roof a second set of runners or tracks 50 is secured, there being one runner at each side of the vehicle. These runners 50 need not be in alignment with the runners 44 and are preferably slightly inclined as shown in Figure 1 to make allowance for the slight rearward curvature of the roof 22.

The front and rear parts of the sliding roof 24 have projecting brackets 52 secured thereto by bolts 53, there being one bracket at each corner of the sliding roof. The rear brackets are secured to the underside of a transversely extending reinforcing member 54 secured to the underside at the rear edge of the roof and each bracket is downwardly curved at its outer extremity and formed into trunnions or shanks 56 as shown in Figure 11. The ends of the trunnions 56 are rounded and have secured thereto the fabric, felt, or other suitable runner member 58 to form a noiseless and antifriction engagement with the runners or tracks 44. The rubber, felt, or other fabric 58 is preferably secured to the end of the brackets 52 by the use of a suitable adhesive to stick them in place. The forward brackets 52 are secured to the underside of a transversely extending reinforcing member 60 secured at the extreme forward edge of the sliding roof. This reinforcing member 60 extends the width of the roof and is generally U-shaped in cross section and has its side edge at 62 secured to the underside of the sliding top 24 with the intermediary parts spaced therefrom. The edge 64 is spaced slightly from the top 24. This construction is best shown in Figure 2. The edges of the sliding top 24 are downturned as indicated at 66 and these downturned parts are in turn secured to the front and rear reinforcing members 60 and 24 as is best shown in Figure 2. Reinforcing members are also applied to the sliding panel or top.

Referring to Figures 2 and 3, it will be seen that at substantially the longitudinal center line of the sliding top 24 a handle 68 is positioned and the shank 70 of the handle is pivotally mounted in the reinforcing member 64 by means of suitable brackets or stampings 72. The shank 70 has a squared part 74 on which there is secured the two-armed lever 76. This lever 76 is best shown in Figures 3 and 4. The lever 76 has pivoted at each end thereof one of the links 78 and 80 and these links extend from the center of the vehicle to the front lateral corners of the sliding top and are pivoted at 81 to levers 92 as is best shown in Figures 3 and 4.

At each front lateral corner of the sliding top a reinforcing plate 82 (Figure 11) is secured as by welding inside the channel of the front reinforcing member 60, and on the outside of the reinforcing member 60 a plate 84 is secured thereto by means of suitable bolts 85 passing through the openings 86 and screwed into threaded openings in the plate 82. The plate 84 has an opening 88 adapted to receive a stud 90 which serves as a pivot for the lever 92, the stud passing through the pivotal opening 94 of the lever. The lever 92 is provided with a boss 96 so that the main part of the lever is spaced from the plate 84.

The plate 84 has a second opening 98 to receive a stud 100 on which there is pivotally mounted a second lever or arm 102, the arm 102 having an opening 104 to receive the stud 100. A slot 106 in the plate 84 is concentric with the opening 98 and in the slot 106 there is received the stud 108 projecting upwardly from the lever 102. The purpose of the slot 106 and stud 108 is to limit the movement of the lever or arm 102. The first lever 92 has a downwardly extending projection or extension 110 which has a double purpose one of which is to engage a downwardly extending lug or projection 112 on the second lever or arm 102 to cause this arm to swing on its pivot 100. The finger or projection 112 on the lever 102 is adapted to engage in any one of the notches 48 in the tracks or runners 44 and when so engaged will hold the sliding top or roof in stationary position.

Figure 7:
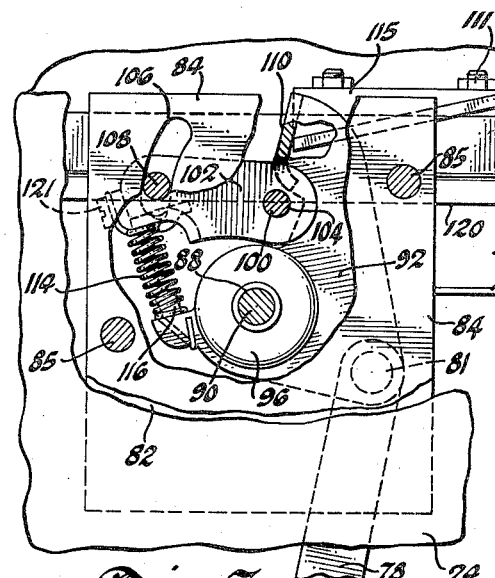
Figure 7 is a view of the parts shown in Figures 5 and 6 but showing the latching mechanism in position after it has been fully operated to throw the linkage of Figure 3 to the over center position and to force the sliding top to its extreme forward position.

The other function of the projection or extension 110 on the lever 92 is to engage with the end of a bracket 115 secured by bolts and nuts 111 to the forward end of the forward runners 44. By referring to Figure 7 it will be seen that the projection or extension 110 of the lever 92 is in firm engagement with this bracket 115 and the operator by moving the handle 68 to swing the links 78 and 80 to the position shown in Figure 3 where they are slightly over center, the projection 110 of the lever 92 will cause the sliding roof 24 to be forced slightly forward to a position a little in advance of the movement which it is possible to give to it by the ordinary manual movement of the roof by the handle 68. This forced forward movement will cause a slight compression of the rubber or fabric packing 117 applied between the edges of the sliding roof and the side and front of the roof opening to give a close and weathertight connection. This packing 117 may be secured either to the sliding top 24 or the edge of the opening 26. Preferably it is secured to the panel edge.

Figure 6:
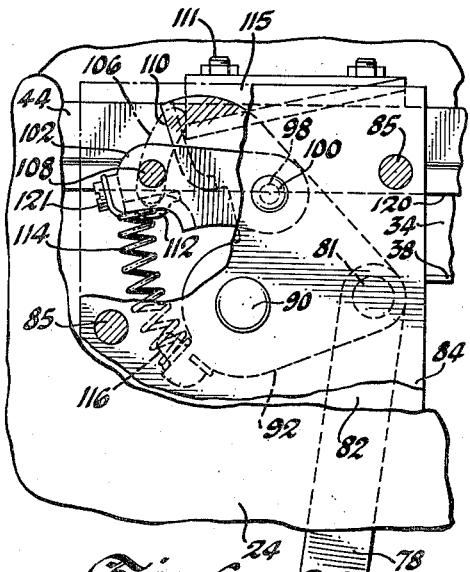
Figure 6 is a view similar to Figure 5 but showing the parts moved toward latched position and just before the operator has operated the latching mechanism to force the top slightly forward for a short additional movement.

Referring to Figure 5, the position of the parts will be seen when the handle 68 has been operated to move the latching mechanism to inoperative position, or the mechanism is ready to be moved further toward fully latched position. In comparing Figures 5, 6, and 7, it will be seen that the links 78 and 80 have been moved successively toward the inside of the vehicle to swing the lever 92 from the position shown in Figure 5 to the position shown in Figure 7. Vice versa, the movement may be regarded as taking place in the reverse direction, i. e., from the position of Figure 7 through the position of Figure 6, to the position of Figure 5. In this latter movement the projection 110 on the lever 92 will engage the extension or finger 112 on the lever 102 to move the finger projection 112 away from its notch 48 or from the track 44 and when it is thus moving away the operator may, by pulling the handle 68 to the rear of the vehicle, cause the sliding top to be moved to any desired position. By releasing the handle the compression coil spring 114, which is positioned between the stud 116 on the lever 92 and a shoulder 118 on the lever 102, will urge the lever 102 toward the runner or track 44 and cause it to engage either outwardly on the edge 120 of the runner or into one of the notches 48. If it is not engaged in a notch 48 the movement of the sliding top either forwardly or rearwardly will eventually cause the finger 112 to engage in one of the notches 48 and hold the top in the position of engagement. A bolt 121 has a loop at the end of the spring 114 therearound and holds one end of the spring in place.

Figure 10:
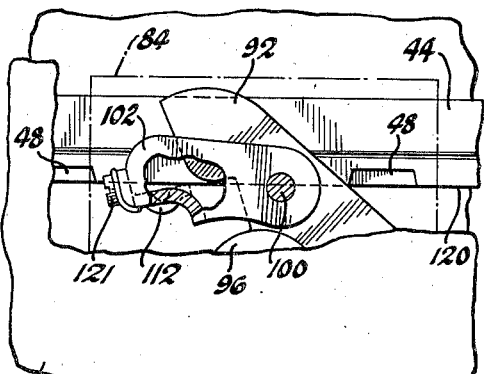
Figure 10 is a view similar to Figure 9 but showing the roof moved slightly to the rear to cause the finger or projection to engage against the edge of the runway or track.

In Figure 10 the finger or projection 112 is shown as out of engagement with a notch and merely resting against the edge 120 of the runner 44. This position is satisfactory and will give a temporary adjustment of the sliding roof 24 but due to the jars received by the vehicle in transit there will be a tendency for the roof to slide either forwardly or rearwardly and the roof will eventually reach a position where the finger 112 will slip into one of the notches 48.

Figure 8:
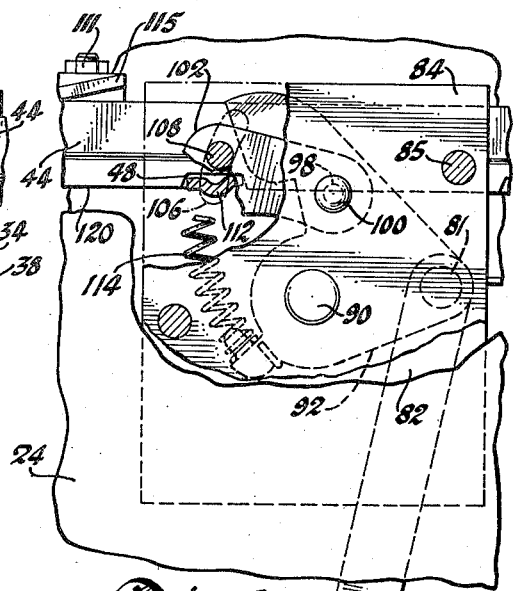
Figure 8 is a view of the latching mechanism in latched position at one of the intermediate points along the track.

In Figure 8 the position of the parts is shown when the sliding roof is at one of the intermediate notches; in other words, the roof is shown as partially open.

Figure 9:
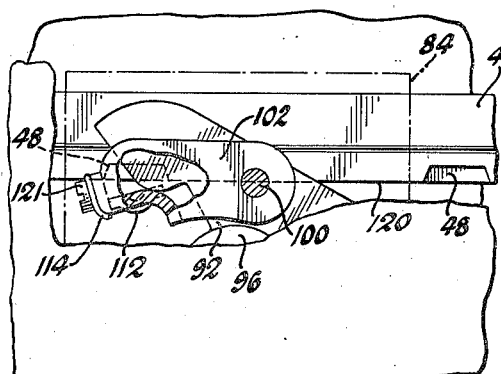
Figure 9 is a further detailed view of the position of the parts in Figure 8 but showing the finger or projection moved out of the notch in the runway or track.

Referring to Figures 9 and 10, a little closer detail is given of the relation of the parts to the edge 120 of the runner 44 and the relation of the parts to the notches 48. In Figure 9 the lever 92 is shown as having just moved the finger 112 out of the notch 48 and in Figure 10 the parts are in substantially the same position, except that the roof has been moved slightly to the right between two notches 48, the lever 92 has been moved through a short arc on its pivot, and the finger 112 may now engage against the edge 120 of the runner. In Figure 10 the operator may move the latching mechanism to latched position but he may move the roof forwardly or rearwardly with the finger 112 sliding on the edge 120 until it engages in the succeeding notch 48. If the operator desires to open the roof further he may re-disengage the finger 112 from the notch 48 and move the roof back farther either into the next notch or one of the notches farther toward the rear. In the position of the parts in Figures 5, 6, 9, and 10, all, or substantially all of the tension is out of the springs 114.

In Figures 1, 2, and 3 there is shown at the rear end of the sliding top 24 the mechanism for raising this rear end from the runner or track 50 flush with the stationary top 22. Two brackets 122, one at each side of the top, are secured in the channels 34 and a track extension lever 124 is pivoted at 126 to each bracket. A dog 128 is pivoted on each lever 124. Each lever 124 has a mouth or slot opening toward the rear of the vehicle when the levers are in their lowered or dotted line position in Figure 2. When the sliding top is pulled forward from the dotted line to the full line position in Figure 1, the top will roll on the felt rollers 130 journally mounted on the levers 124. The mouths of the track extensions or levers 124 are in the path of the trunnions 56 of the brackets 52 and when the sliding top is close to the end of its forward movement, the trunnions or shanks 56 will be at the bottom of the mouths and further forward movement of the top will cause the levers 124 to swing on their pivots 126. This upward movement of the lever will be aided by the coil springs 132' which always urge the levers from the dotted line to the full line position in Figure 2. This swinging of the levers 124 about their pivots will cause the rear end of the top to move upwardly until the plane of its top is coincident with the plane of the stationary vehicle top 22. The dog 128 will grasp the trunnion or shank 56 and hold it in the mouth of the lever 124 until the lever 124 is again lowered to the dotted line position. This mechanism and structure and its operation is better disclosed and described in the copending application of Emory Glenn Simpson referred to in the foregoing.

The rear end of the sliding top is downwardly offset as shown at 132 and on this downwardly offset part there is secured a strip of 134 of fabric, rubber or the like and this strip 134 is tightly pressed up against the rear edge at 30 of the opening 26 when the sliding top 24 is in closed position in order to give a weathertight seal.

A rubber or fabric filler block 136 is secured by means of a bolt 138 in the rear end of each track 44 to limit the rearward movement of the sliding top 24.

We claim:
1. In an automobile having a roof with a section thereof slidable in tracks or guides secured to the stationary part of the roof at the sides thereof, a plurality of notches in said guides, means at the edges of the sliding section adjacent the notches to latch the sliding section of the roof in stationary position at the extremities of its sliding movement or at a plurality of intermediate points, said means comprising two levers, one lever pivoted at each side of the sliding section at its front end, means simultaneously to operate said levers from the inside of the sliding top, two arms, one arm at each side of the sliding section and operably associated with said levers, said arms adapted to engage in the notches to hold the sliding section in stationary position, said arms operated in one direction by the movement of said levers.

2. In an automobile having a roof with a section thereof slidable in tracks or guides secured to the stationary part of the roof at the sides thereof, a plurality of notches in said guides, means at the edges of the sliding section adjacent the notches to latch the sliding section of the roof in stationary position at the extremities of its sliding movement or at a plurality of intermediate points, said means comprising two levers, one lever pivoted at each side of the sliding section at its front end, means simultaneously to operate said levers from the inside of the sliding top, two arms, one arm at each side of the sliding section and operably associated with said levers, said arms adapted to engage in the notches to hold the sliding section in stationary position, two springs, one spring between each arm and each lever, said arms operated in one direction by the movement of said levers.

3. In a latching mechanism for a sliding vehicle top operable in guides or runners mounted at the side of the top, a plurality of spaced notches in said runners, a first lever pivoted to the top, a second lever pivoted to the top and adapted to be operated in one direction by the movement of the first lever, said second lever adapted to engage in the said notches to hold the sliding top in stationary position, a spring between the two levers and constantly urging the levers apart and the second lever against the runner or into one of the notches, and means to operate the first lever to cause the second lever to be removed from its notch to enable the movement of the sliding top.

4. In a latching mechanism for a sliding vehicle top operable in guides or runners mounted at the side of the top, a plurality of spaced notches in said runners, a plate secured to the underside of the sliding top adjacent the forward corner thereof, a lever pivoted to said plate, a second lever pivoted to the plate and operable by the first lever for movement in one direction, a projection on said second lever adapted to engage in the notches in the runners to hold the sliding top in stationary position, a spring between the levers and constantly urging said projection against the runners or into one of the notches, and means to operate the said first lever.

5. In a latching mechanism for a sliding vehicle top operable in guides or runners mounted at the side of the top, a plurality of spaced notches in said runners, a plate secured to the underside of the sliding top adjacent the forward corner thereof, a lever pivoted to said plate, a second lever pivoted to the plate and operable by the first lever for movement in one direction, said plate having a slot, a stud projecting from the second lever into the slot and limiting the movement of the second lever, a projection on said second lever adapted to engage in the notches in the runners to hold the sliding top in stationary position, a spring between the levers and constantly urging said projection against the runners or into one of the notches, and means to operate the said first lever.

6. In an automobile having a roof with a section thereof slidable in tracks or guides secured to the stationary part of the roof at the sides thereof, a plurality of notches in said guides, means at the edge of the sliding section adjacent the notches to latch the sliding section of the roof in stationary position at the extremities of its sliding movement or at a plurality of intermediate points, means secured to the sliding section of the roof and operable from the inside of the vehicle to cause said first named means to engage in the notches to enable the slidable section to be moved or to be disengaged from or to enable said first named means to cause the roof to be held in stationary position respectively, and means incorporated with said second named means and engageable with a stationary part of the roof to force the slidable roof tightly into the closed position after it has been manually moved to the extremity of its closed position.

7. In an automobile having a roof with a section thereof slidable in tracks or guides secured to the stationary part of the roof at the side thereof, a plurality of notches in said guides, means to latch the sliding section of the roof in stationary position at the extremities of its sliding movement or at a plurality of intermediate points, two levers, one lever pivoted at each side of the sliding section at its front end, means simultaneously to operate said levers from the inside of the sliding top, two arms, one arm at each side of the sliding section and operably associated with said levers, said arms adapted to engage in the notches to hold the sliding section in stationary position, said arms operated by the movement of said levers, and means on the lever and engageable with the stationary part of the roof to force the sliding roof tightly into closed position after it has been manually moved to the extremity of its closed position.

JAMES H. WERNIG.
GUSTAVE CHUTORASH.